Feb. 25, 1958   G. BETHMANN   2,824,504
QUICK MOUNTING MEANS FOR PHOTOGRAPHIC CAMERAS
Filed Sept. 2, 1955

United States Patent Office 2,824,504
Patented Feb. 25, 1958

2,824,504

QUICK MOUNTING MEANS FOR PHOTOGRAPHIC CAMERAS

Gustav Bethmann, Braunschweig, Germany, assignor to Franke & Heidecke, Fabrik Photographischer Prazisions-Apparate, Braunschweig, Germany, a German firm Application September 2, 1955, Serial No. 532,303

Claims priority, application Germany June 7, 1955

4 Claims. (Cl. 95—86)

This invention relates to means for mounting a photographic camera quickly on a tripod or other suitable support, and quickly removing it therefrom.

An object of the invention is the provision of an improved form of quick mounting means in which the camera is clamped immovably in fixed position on the mounting means, with no possibility of accidental rotation.

Another object is the provision of quickly attachable and detachable mounting means so designed and constructed that the clamping means for clamping the camera in place is itself latched to prevent accidental release of the clamping means.

A further object is the provision of improved and more satisfactory mounting means for a photographic camera, having means for supporting the camera, clamping means for clamping the camera immovably to the supporting means, an actuating member for actuating the clamping means, and latching means for latching the actuating member against accidental movement to unclamping position.

These and other desirable objects may be attained in the manner disclosed as an illustrative embodiment of the invention in the following description and in the accompanying drawings forming a part hereof, in which.

The same reference numerals throughout the several views indicate the same parts.

The present construction is in the nature of an improvement on the first of the two forms of construction disclosed in the copending U. S. patent application of Richard Weiss for "Quick Attachable Mounting for Photographic Cameras," Serial No. 532,219, filed September 2, 1955. Reference is made to said copending application for a more complete disclosure of those parts of the present invention which are common to both applications.

Figure 3:
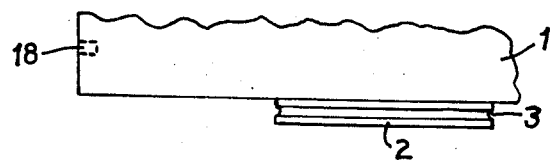
Fig. 3 is a side elevation of the lower part of a camera body of suitable construction for mounting on the mechanism shown in Figs. 1 and 2.

The present invention is intended for use with any suitable kind of photographic camera, the body of which is indicated schematically at 1 in Fig. 3, having on the bottom thereof a circular plate 2 with a peripheral or circumferential groove 3 extending around the circular periphery thereof. The plate itself constitutes a mounting element which may be either attached permanently to the camera body, or provided with a screw threaded stud which screws into the usual tripod screw socket commonly found in the bottom of a modern camera.

The present invention permits any camera equipped with such a circular grooved plate to be mounted very quickly and removed quickly from a tripod or other support. As in said copending application of Richard Weiss, the present construction comprises a body or base member 4 having a central aperture 5 threaded to receive the usual threaded mounting stud or screw of a photographic tripod, whereby the base 4 may be mounted on a tripod or on any other desired support equipped with the standard mounting screw. The base 4 carries a pair of parallel rails 6 which project rearwardly from the base and have, in their rear parts, edges 7 arranged parallel to each other and open at their rear ends so as to make tangential engagement with the groove 3 in the above mentioned circular grooved plate 2 on the bottom of the camera, when the camera is moved horizontally forwardly with such groove 3 in alinement with the edges 7, which are spaced just far enough from each other to fit snugly and tangentially in such groove. The forward motion of the camera, when mounting it on these rails, is arrested by a pair of shoulders 8 on the two rails. The rear ends of the rails are secured to each other, for greater strength, by a web or cross bar 31, but it will be noted that this cross bar lies below the level or plane of the edges 7 and does not interfere with the movement of the circular mounting plate of the camera along the edges 7 of the rails.

By means of screws 9, a resilient spring plate 10 is secured to the base 4 and extends rearwardly in cantilever fashion at a level below the plane of the rail edges 7. The rear portion 11 of the spring plate 10 carries a plate or shoe 12 having a ridge or rib 13 near its rear end. This ridge or rib 13 is in such position that it constitutes a locking bolt coming up just behind and in contact with the rear edge of the circular mounting plate 2 of the camera, if such mounting plate is mounted on the rail edges 7 and pushed forwardly to contact with the abutments 8 and if the spring plate 10 is then flexed upwardly to carry the plate 12 up against the bottom of the mounting plate 2 on the camera.

Figure 1:
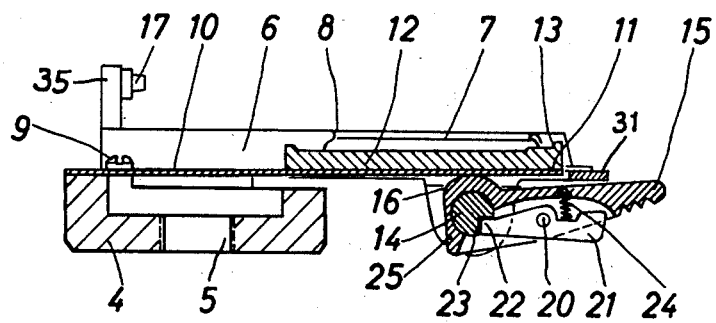
Fig. 1 is a vertical section taken centrally through mechanism in accordance with a preferred embodiment of the invention, illustrating the parts in clamped position.

Ears 33 depending from the rails 6 serve to support a cross shaft 14 in fixed position, this shaft lying below the spring plate 10. Rotatable through a limited range on this fixed shaft 14 is an actuating member 15 having an eccentric cam portion 16 so shaped that when the handle portion 15 is swung counterclockwise to an approximately horizontal position as shown in Fig. 1, the cam portion 16 forces the rear portion 11 of the spring plate 10 upwardly, bringing the plate 12 tight up against the bottom of the above mentioned circular mounting element 2 on the bottom of the camera, thereby clamping the camera immovably on the rail edges 7. At the same time, the upward movement of the plate 12 carries the rib or ridge 13 up just behind and in contact with the rear part of the curved edge of the camera plate, to act as a bolt locking the camera plate in place between this rib 13 at its rear and the abutment 8 at its front, so that the camera can move neither forwardly nor rearwardly. The frictional engagement of the shoe 12 with the element 2 prevents rotary movement of the camera, while engagement of the groove 3 with the rail edges 7 prevents upward and downward movement of the camera. When the handle portion 15 of the actuator is swung clockwise from the position shown in Fig. 1 to the position shown in Fig. 2, however, the cam portion 16 releases the upward pressure on the bottom of the spring plate 10 and allows this spring plate, together with the shoe plate 12, to move downwardly to a position in which it no longer presses against the camera element 2 and in which the ridge 13 no longer lies behind the rear edge of the camera element 2. The camera can now be removed by a simple rearward movement, sliding it rearwardly off of the mounting edges 7 of the rails 6.

Figure 2:
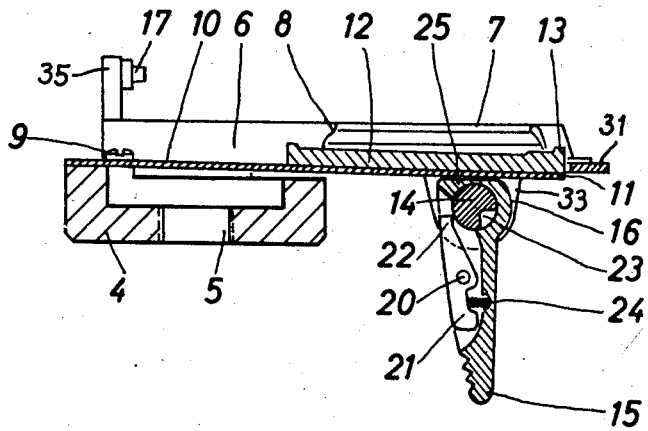
Fig. 2 is a similar view illustrating the parts in released or unclamped position.

To prevent accidental downward or releasing movement of the actuator 15 from the position shown in Fig. 1 to the position shown in Fig. 2, the actuator handle is centrally hollowed out and is provided with a cross pin 20 serving as a pivotal mounting for a latching pawl, the rear end 21 of which is normally swung clockwise by a small spring 24, to tend to move the forward end 22 of this pawl closer to the center of the shaft 14 and to keep it engaged in a notch 23 of the shaft. So long as the end 22 remains in the notch 23, in the position shown in Fig. 1, the actuator 15 cannot turn clockwise on the fixed shaft 14, so that accidental release of the camera mounting is impossible. To release the camera, it is first necessary to squeeze upwardly on the end 21 of the pawl while squeezing downwardly on the handle 15, thereby moving the pawl nose 22 out of the notch 23, whereupon the actuating handle 15 may be swung down to the release position shown in Fig. 2.

When the camera is mounted in normal clamping position on the rails, recesses or openings 18 formed in the front wall of the camera near the bottom edge thereof receive fixed pins 17 mounted on the lugs or ears 35 which rise from the forward ends of the rails 6, thereby preventing any turning or twisting of the camera and serving to hold it against rotation on its mounting, thus supplementing the clamping action of the plate 12. Also the engagement of the pins 17 in the holes 18 enables the camera, after removal from the mounting means, to be replaced thereon in exactly the same position of orientation it previously occupied.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. Quickly attachable and detachable mounting means for photographic cameras of the type having a mounting plate provided with grooves on opposite edges, said mounting means comprising a pair of rails spaced laterally from each other and having edges adapted to embrace the mounting plate of the camera and to be received in the grooves thereof, a movable clamping member for engaging said mounting plate to hold it against detaching movement relative to said rails, a shaft extending below and substantially crosswise to said pair of rails, a clamp actuating member swingable on said shaft from an effective clamping position to a released position, and a releasable locking pawl operatively connected to said clamp actuating member and serving to hold said clamp actuating member in effective clamping position until said pawl is released to permit said clamp actuating member to be swung to released position.

2. Quickly attachable and detachable mounting means for photographic cameras of the type having a mounting plate provided with grooves on opposite edges, said mounting means comprising a pair of rails spaced laterally from each other and having edges adapted to embrace the mounting plate of the camera and to be received in the grooves thereof, a movable clamping member underlying said mounting plate for engaging the bottom of said mounting plate to hold it against detaching movement relative to said rails, a shaft mounted in fixed position relative to said rails below the bottom of said clamping member, a clamp actuating member mounted on said shaft for swinging movement thereon between an effective clamping position forcing said clamping member upwardly against the bottom of said mounting plate and a clamp releasing position, a notch in said shaft, and a spring biased latch mounted on said actuating member and engaging said notch when said actuating member is in effective clamping position to tend to hold said actuating member in such position.

3. The combination with a photographic camera body, of a support on which said body may be detachably mounted, a movable blocking member shiftable upwardly and downwardly from a lower ineffective position to an upper effective position blocking said camera body against removal from said support when mounted thereon, an operating handle for said blocking member, a shaft on which said operating handle is movably mounted, said shaft extending approximately horizontally below said movable blocking member, an abutment on said shaft, a notch in said handle, and a pawl mounted at least partly in said notch and engaging said abutment when said handle is in an effective blocking position, to tend to hold said handle in such position.

4. The combination with a photographic camera body, of a support on which said body may be detachably mounted, a movable blocking member shiftable from an ineffective position to an effective position blocking said camera body against removal from said support when mounted thereon, an operating handle for said blocking member, a shaft on which said operating handle is movably mounted, an abutment on said shaft, a notch in said handle, a pawl mounted at least partly in said notch and engaging said abutment when said handle is in an effective blocking position, to tend to hold said handle in such position, a pin extending across said notch, said pawl being swingably mounted on said pin intermediate the ends of the pawl, one end of the pawl being adapted to engage said abutment, the other end of said pawl projecting from said handle to an accessible position, and a spring located at least partly within said notch for resiliently engaging said pawl to tend to keep said one end thereof engaged with said abutment.

References Cited in the file of this patent

UNITED STATES PATENTS 2,351,386     Zucker _____ June 13, 1944

FOREIGN PATENTS 813,937     Germany _____ Sept. 17, 1951